(12) United States Patent
Davis

(10) Patent No.: US 8,852,717 B2
(45) Date of Patent: Oct. 7, 2014

(54) DISPOSABLE MAT AND METHOD FOR CONTAINING A SPILLED LIQUID

(76) Inventor: Gail Elizabeth Davis, Houston, TX (US)

( * ) Notice: Subject to any disclaimer, the term of this patent is extended or adjusted under 35 U.S.C. 154(b) by 932 days.

(21) Appl. No.: 12/701,046

(22) Filed: Feb. 5, 2010

(65) Prior Publication Data

US 2011/0192419 A1 Aug. 11, 2011

(51) Int. Cl.
| | |
|---|---|
| B32B 3/24 | (2006.01) |
| A01K 1/01 | (2006.01) |
| A01K 5/01 | (2006.01) |
| B32B 27/08 | (2006.01) |
| B08B 17/00 | (2006.01) |
| B08B 17/02 | (2006.01) |
| A01K 1/015 | (2006.01) |
| B32B 25/08 | (2006.01) |
| A01K 7/00 | (2006.01) |

(52) U.S. Cl.
CPC .............. *B08B 17/00* (2013.01); *A01K 1/0107* (2013.01); *A01K 5/0135* (2013.01); *B32B 27/08* (2013.01); *B08B 17/025* (2013.01); *A01K 1/0157* (2013.01); *B32B 25/08* (2013.01); *A01K 7/005* (2013.01)
USPC ............................. 428/138; 428/198; 119/169

(58) Field of Classification Search
CPC .............................. A01K 1/0157; A01K 7/005
USPC .................................. 428/138, 198; 119/169
See application file for complete search history.

(56) References Cited

U.S. PATENT DOCUMENTS

| | | | |
|---|---|---|---|
| 3,642,550 A * | 2/1972 | Doll | 156/78 |
| 4,321,997 A * | 3/1982 | Miller | 206/204 |
| 4,852,517 A | 8/1989 | Smith et al. | |
| 4,892,535 A * | 1/1990 | Bjornberg et al. | 604/380 |
| 5,520,945 A | 5/1996 | Coggins | |
| 5,712,012 A | 1/1998 | Forman et al. | |
| 5,715,772 A | 2/1998 | Kamrath et al. | |
| 6,295,658 B1 | 10/2001 | Jenkins | |
| 6,550,423 B1 | 4/2003 | Pope | |
| 6,838,398 B2 | 1/2005 | Repp et al. | |
| 7,007,635 B2 | 3/2006 | Kincaid | |
| 7,249,570 B1 | 7/2007 | Roberson | |
| 2004/0019993 A1 | 2/2004 | Blum et al. | |
| 2006/0260559 A1 | 11/2006 | Fry et al. | |

* cited by examiner

*Primary Examiner* — William P Watkins, III

(57) ABSTRACT

In a method for containing a spilled liquid, a mat is provided onto a surface. The mat includes a liquid permeable upper layer disposed above a liquid impermeable lower layer, with a watertight adhesive securing the upper layer to the lower layer. The watertight adhesive defines one or more enclosed regions between the upper and lower layers. A vessel containing liquid can be placed on the mat, accessible by an animal or human, such that liquid spilled from the vessel falls onto the mat above the one or more enclosed regions. The spilled liquid permeates through the liquid permeable upper layer onto one or more enclosed regions, where the liquid impermeable lower layer prevents further vertical permeation of the liquid while the watertight adhesive that bounds the enclosed regions inhibits lateral permeation of the liquid. The spilled liquid is thereby contained in the enclosed regions onto which it was spilled.

20 Claims, 3 Drawing Sheets

DISPOSABLE MAT AND METHOD FOR CONTAINING A SPILLED LIQUID

FIELD

The present invention relates, generally, to methods for containing and/or cleaning spilled liquids and a disposable mat usable with such methods.

BACKGROUND

Normally, when feeding an infant or young child, an elderly individual, or a pet, it is common for water or other liquids, including liquid components of foods, to be spilled from their containers. The spilled liquid can damage or discolor a floor, table, or other surface on which the container was placed, create a safety and/or sanitation hazard, and can require tedious and cumbersome steps to be taken to clean the spill. To somewhat diminish the damage caused to a floor or table by a liquid, and to reduce the ability of the liquid to spread throughout a large surface area, it is common to provide a placemat or coaster, for humans, or a feeding mat for animals, underneath bowls, cups, mugs, glasses, plates, saucers, feeding dishes, or any other vessels usable to contain liquid and/or food. Such mats can be made from cotton, linen, or similar cloth or textile materials, intended to absorb spilled liquid to prevent its spread. However, absorbent textile mats are prone to acquire stain or damage, the cleaning process for such a mat can be cumbersome, and many such mats are unable to withstand conventional cleaning measures without becoming worn or damaged. Alternatively, to facilitate durability, plastic and rubber mats are also usable, which do not significantly prevent the spread of a spilled liquid, but are less prone to wear or damage and more easily cleaned for reuse. Liquids spilled on a plastic mat must be cleaned promptly, as a failure to immediately attend to such a spill can permit the liquid to spread beyond the edges of the mat to the surface on which the mat has been placed.

Disposable mats have been used to enable absorption of spilled liquids while eliminating the need to clean the mats after use. Most disposable mats utilize paper or similar disposable absorbent materials, which can allow liquids to soak through the absorbent materials and contact the surface below. While effective for containing minor spills, or spills that are attended to promptly, disposable mats can permit a spilled liquid to spread beyond the edges of the mat once the absorbent material has become saturated, thus failing to completely contain the spill. Disposable mats are also generally unattractive in appearance, as the expenditure of significant time and resources to produce a decorative product that will ultimately be discarded after a single use has generally not been cost effective.

A need exists for a method for containing spilled liquid that incorporates the use of a disposable mat that includes both liquid permeable and liquid impermeable layers, thereby enabling absorption and containment of liquids while preventing the spilled liquids from soaking through the mat.

A need also exists for a method for containing spilled liquid that prevents the lateral spread of liquid beyond the edges of such a mat.

Additionally, a need exists for disposable mats that are able to be provided with a unique and/or customized appearance, and possess improved effectiveness for containing spills and an improved usable life when compared to conventional disposable mats.

The present invention meets these needs.

BRIEF DESCRIPTION OF THE DRAWINGS

In the detailed description of the embodiments of the invention presented below, reference is made to the accompanying drawings, in which.

Figure 1A:
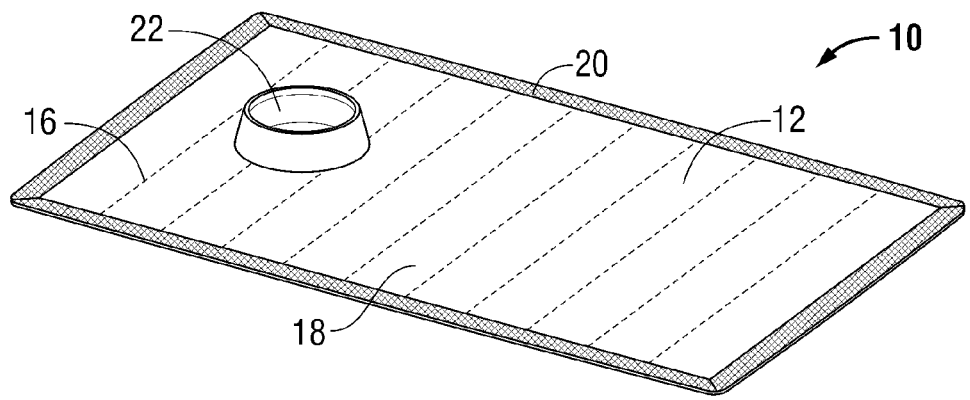
FIGS. 1A through 1E depict perspective views of embodiments of mats usable within the scope of the present invention.

The depicted embodiments of the invention are described below with reference to the listed Figures.

DETAILED DESCRIPTION OF THE EMBODIMENTS

Before explaining the disclosed embodiments of the invention in detail, it is to be understood that the present invention is not limited to the particular embodiments depicted or described, and that the invention can be practiced or carried out in various ways.

The present invention relates, generally, to methods for containing a spilled liquid, and disposable mats usable with such methods. When feeding domesticated animals, such as felines or canines, or alternatively, when feeding humans, especially younger children and elderly individuals, it is commonplace for water, other liquid beverages, or liquid and/or semi-solid components from many types of food to be spilled from their containers.

To prevent spilled liquid from damaging a floor, table, or other surface on which a container can be placed, a mat can be provided over the surface, such that containers of liquid can be placed on the mat. Mats usable within the scope of the present invention can generally include a liquid permeable upper layer disposed on top of a liquid impermeable lower layer.

The upper layer can be formed from any manner of porous and/or fibrous, disposable material that will permit the passage of liquid therethrough, such that the top surface of the mat does not retain any significant collection of liquid thereon. The passage of liquid through the upper layer thereby minimizes the transfer of liquid to other objects or body parts that contact the upper surface of the mat. This feature is of significant benefit when providing liquid to pets, who could otherwise step into collected liquid when walking or standing on the mat, then walk elsewhere within a structure, undesirably depositing liquid as they travel. The upper layer can be formed from cotton, paper, rubber, sponge, plastic, one or more composites or polymers, one or more textile materials, or combinations thereof. In an embodiment of the invention, the upper layer can be at least partially absorbent, in addition to possessing liquid permeability. In various embodiments of the invention, the upper layer can include one or more "super absorbent" materials to prevent the spread of spilled liquid. The upper layer can be textured and/or quilted to facilitate absorption and/or permeation of liquid therethrough, improve traction when walked upon, and/or provide aesthetic effect, or alternatively, the upper layer can be generally smooth to facilitate customization with various decorative images, text, patterns, ink, and/or photographs.

The lower layer can be formed from any generally continuous segment of liquid impermeable material, such as plastic, rubber, one or more composites or polymers, or combinations thereof. The contiguous, impermeable nature of the lower layer provides a lower barrier to the mat, preventing liquid that passes through the upper layer from contacting the surface underneath the mat. The lower layer can be provided with a sufficient thickness and durability to enable the mat to be lifted when liquid is contained thereon without being bent or folded by the weight of the liquid, or otherwise allowing the liquid to spill. For example, the lower layer can include a generally thin layer of semi-rigid plastic. In an embodiment of the invention, the lower layer can be provided with ridges, corrugation, or similar textural features to channel and/or contain spilled liquid more effectively than a wholly smooth surface. However, it should be understood that a generally smooth lower layer can also be provided. In an embodiment of the invention, the lower layer can include an adhesive, frictional, and/or non-slip strip or surface disposed on a bottom side to prevent movement along or from the surface on which the mat is placed.

The upper and lower layers can be secured together using one or more watertight adhesives, which can include any manner of rubber, resin, and/or polymer or co-polymer components known in the art, able to provide sufficient bond strength to prevent separation of the layers, while forming a watertight seal therebetween. The watertight adhesive forms one or more enclosed regions between the upper and lower layers, the enclosed regions being bounded in a vertical direction by the lower layer and in each lateral direction by the watertight adhesive.

In various embodiments of the invention, the watertight adhesive can be used to form multiple bounded regions between the upper and lower layers. For example, while the watertight adhesive could simply encircle the border of the upper and lower layers to form a single enclosed region, the adhesive could also bisect the mat in halves, thirds, quarters, or any other manner of partitioning. In further embodiments of the invention, the adhesive can be applied in a functional pattern, such as a honeycomb pattern, a grid, a diamond pattern, horizontal or vertical lines to form adjacent rectangles, any other shape or pattern to facilitate containment, encapsulation, and/or retention of liquid, or combinations thereof, thereby providing a plurality of enclosed regions and an improved seal between layers.

Generally, the watertight adhesive can extend vertically from the liquid impermeable lower layer of the mat to the top surface of the liquid permeable upper layer, to ensure that no exodus of liquid from an enclosed region occurs through the upper layer. In an embodiment of the invention, the watertight adhesive can extend slightly beyond the top surface of the upper layer to form a ridge, further enhancing the prevention of lateral fluid flow from within an enclosed region of the mat, while providing an external pattern and/or texture to the mat and adding functional traction should the mat be walked upon by an animal.

Alternatively, or in addition to use of one or more watertight adhesives, the upper and lower layers can be secured together by quilting or otherwise adhering the layers to one another such that one or more enclosed pockets or regions are defined. In further embodiments of the invention, the edges of the upper and lower layers can be crimped, pressed, or otherwise adhered together to prevent the lateral spread of liquid beyond the edge of the mat. Further, any combinations of crimping, adhesive, pressing, or other methods of securing the layers to one another can be used.

In selected embodiments of the invention, an absorbent middle layer can be provided between the upper and lower layers, to facilitate absorption and retention of spilled liquid within the mat. The middle layer can be formed from any generally absorbent material, including cotton, paper, textile, sponge, or other similar materials.

In further embodiments of the invention, the upper and/or lower layers can be provided with decorative content, such as colors, text, pictures, and/or patterns, and/or customized content, such as the name of an animal intended to utilize the mat, a picture of an animal, or similar content. Similarly, any layer of the mat may be provided in a unique, customized, decorative, and/or functional shape, such as a curved or irregular polygon or other shape adapted to cover a uniquely shaped region of a table or floor without requiring rearrangement of furniture, centerpieces, or other articles. The shape and/or dimensions of the mat, or roll, as described below, can be varied to suit any desired space, or occasion, including shapes representative of holidays, sporting events, and the like. For example, in an embodiment of the invention, the mat could be round or square, having a diameter or a length and width, respectively, of approximately one foot, for containing a single bowl of water for a pet. In other exemplary embodiments, the mat can be rectangular, having a length ranging from two to three feet, and a width ranging from one to two feet, for use as a placemat at a table, or a feeding mat for a pet that can be used to contain both food and water receptacles. It should be understood that while embodiments of the mat can generally be limited in size to facilitate lifting and disposal of liquid contained thereon, larger mats are also usable when it is desirable to protect a sizable region of a table or floor from numerous vessels containing liquid and/or food. For example, mats can be provided in a smaller size, intended for use when feeding and/or providing water to felines, a larger size when providing food and/or water to canines, and a significantly larger size to accommodate large breeds of canines. Mats can also be provided having shapes and/or sizes suitable for use as placemats or coasters for humans.

In a further embodiment of the invention, usable mats can have sufficient flexibility to be provided in a cylindrical roll, or a similar shape to facilitate storage of a large quantity of mat material usable for dispensation of a mat having any selected length. For example, a desired length of mat material, such as a length sufficient to cover an examination table in a doctor's office or a veterinary office, or the floor of a cage or kennel, can be unrolled, then cut or torn through use of an attached serrated edge or a separate cutting implement. Alternatively, in selected embodiments of the invention, individual mats can be stacked and packaged for easy access and dispensation of individual mats for use.

In use, vessels containing liquid can be placed on top of the mat, above or close to one or more enclosed regions, such that if an animal accessing the liquid spills the liquid from the vessel, the majority of the spilled liquid will fall on the mat and become contained and/or encapsulated within one or more of the enclosed regions defined by the watertight adhesive and/or the quilting between layers. Spilled liquid that contacts the mat permeates through the liquid permeable upper layer, where it is bounded from lateral spreading beyond the enclosed regions onto which it permeates, while the liquid impermeable lower layer prevents the spilled liquid from penetrating through the mat to contact the surface below. The spilled liquid is thereby prevented from spreading beyond the bounds of the mat prior to cleaning the spill. When it is desired to clean the spill, the mat containing the spilled liquid, can be lifted and/or folded, as needed, and/or retained in a generally horizontal or level orientation such that no liquid is spilled from the mat.

Referring now to FIG. 1A, a perspective view of an embodiment of a mat (10) usable within the scope of the present invention is depicted. While the depicted mat (10) is shown having a generally rectangular shape, it should be understood that embodiments of the invention can include use of mats having any desired shape, including both functional and decorative shapes, and any desired dimensions.

Figure 2:
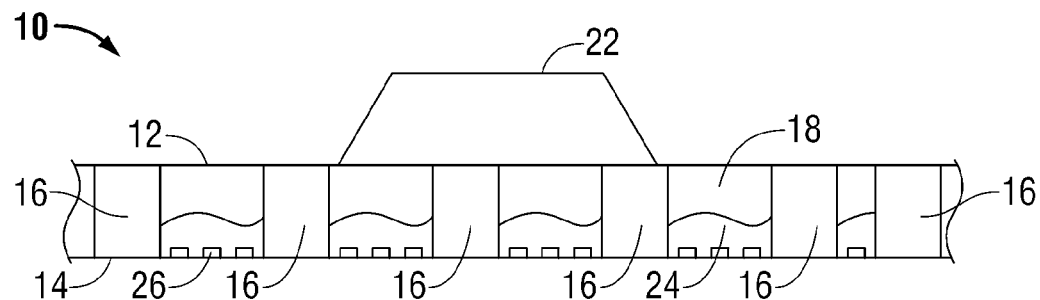
FIG. 2 depicts a partial, exploded, cross sectional view of the mat of FIG. 1A.
Figure 3:
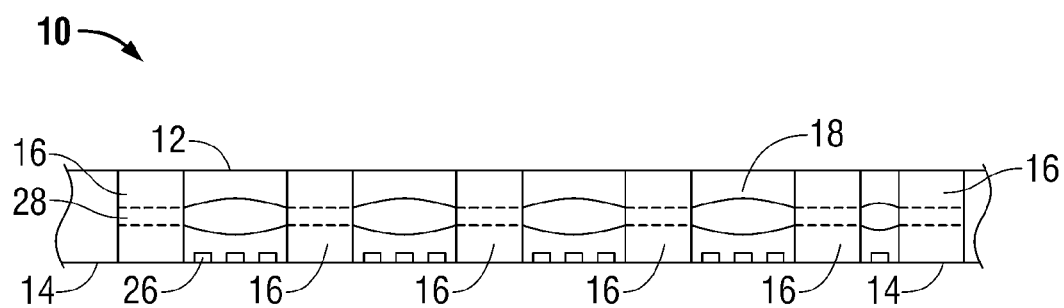
FIG. 3 depicts a partial, exploded, cross sectional view of an alternate embodiment of a mat usable within the scope of the present invention.
Figure 4:
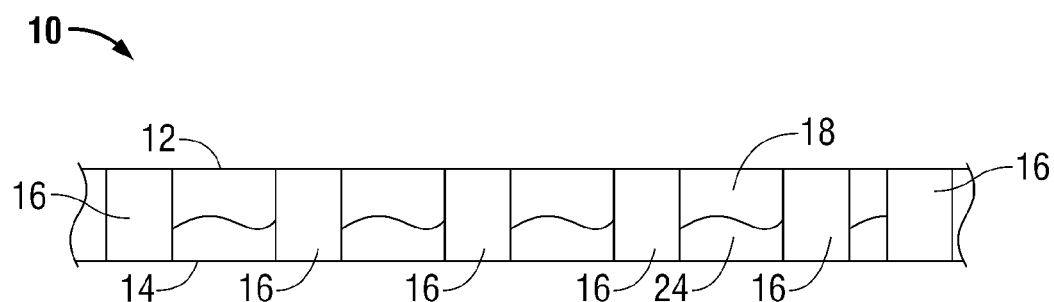
FIG. 4 depicts a partial, exploded, cross sectional view of another embodiment of a mat usable within the scope of the present invention.

The mat (10) is shown having a liquid permeable upper layer (12) secured above a liquid impermeable lower layer (14, shown in FIGS. 2-4). The liquid impermeable upper layer (12) is shown as rectangular in shape, having a length and width approximately equal to that of the liquid permeable lower layer, such that the layers substantially overlap one another; however, it should be understood that in various embodiments of the invention, the liquid permeable upper layer (12) can have dimensions that differ from those of the liquid impermeable lower layer (14), such that a partial, shaped or selected, decorative and/or functional portion of the liquid impermeable lower layer (14) is overlapped by the liquid permeable upper layer (12).

The upper and lower layers (12, 14) are shown secured to one another through use of a watertight adhesive (16), which can include any type of rubber, plastic, resin, and/or polymer composition usable to form a watertight seal between the layers (12, 14). While the watertight adhesive (16) can be provided between the upper and lower layers (12, 14) in any desired shape or pattern, FIG. 1A depicts the watertight adhesive (16) disposed in generally parallel vertical lines. Thus, the watertight adhesive (16) defines a plurality of enclosed regions (18), having the shape of adjacent vertical rectangles. The upper and lower layers (12, 14) are further secured to one another through use of a crimped edge (20), which provides lateral bounds to each of the enclosed regions (18), in addition to securing the upper and lower layers (12, 14).

For illustrative purposes, FIG. 1A depicts a liquid container (22), shown as a drinking bowl for a dog or similar animal, provided on top of the mat (10). Liquid spilled from the container (22) by an animal will contact and penetrate through the liquid permeable upper layer (12) to enter one or more of the plurality of enclosed regions (18). Within the enclosed regions onto which the liquid falls, the liquid will be inhibited from further vertical permeation by the liquid impermeable lower layer (14), from lateral permeation into adjacent enclosed regions by the watertight adhesive (16), and from lateral permeation beyond the border of the mat (10) by the crimped edge (20). Alternatively and/or additionally, the crimped edge (20) can include one or more watertight adhesives.

While FIG. 1A depicts a mat (10) having a watertight adhesive (16) disposed between upper and lower layers in generally parallel, vertical lines, it should be understood that other configurations of the watertight adhesive (16) are also usable, to define enclosed regions having any desired shape. Further, while FIG. 1A depicts a mat (10) having a crimped edge (20), in various embodiments of the invention, use of crimping can be omitted, and optionally, watertight adhesive can be applied along or close to the border of the mat (10). Additionally, in lieu of watertight adhesive, in various embodiments of the invention, the upper and lower layers of the mat (10) can be quilted together, such that the quilting defines a plurality of enclosed regions to facilitate containment of spilled liquid.

Figure 1B:
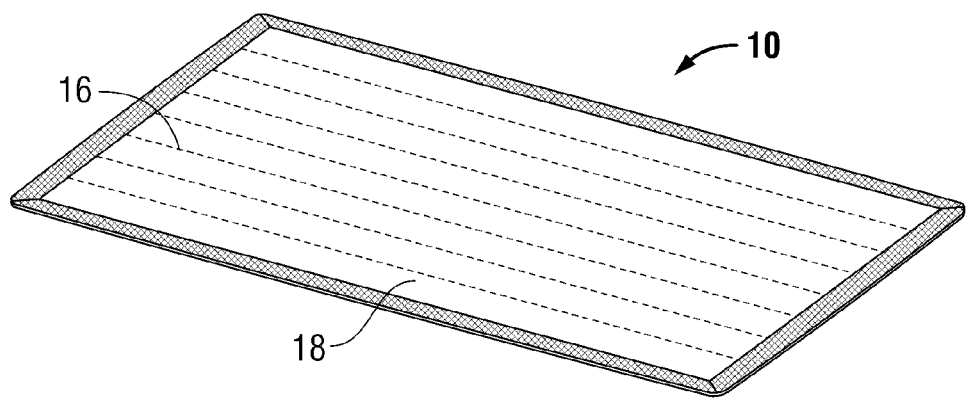
Figure 1C:
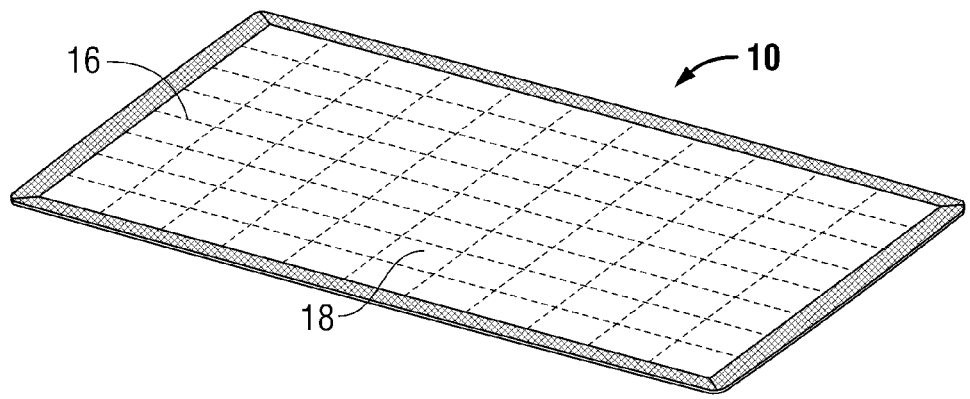
Figure 1D:
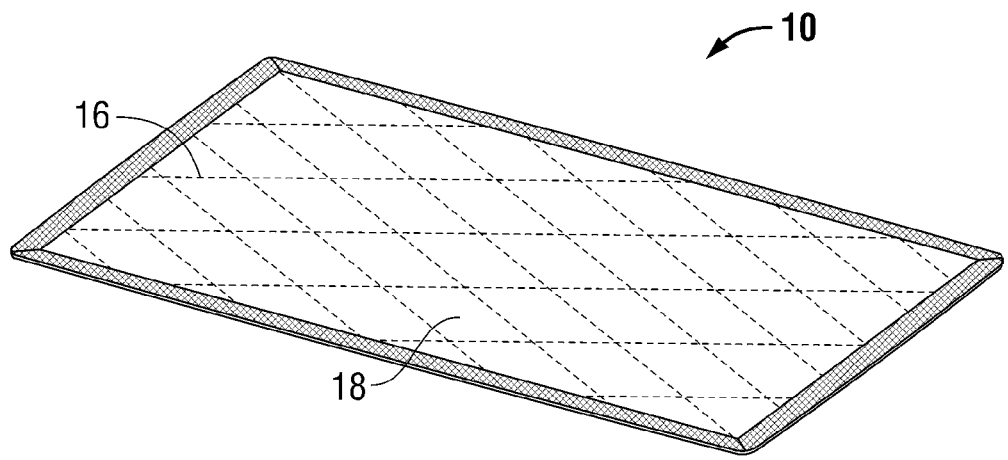
Figure 1E:
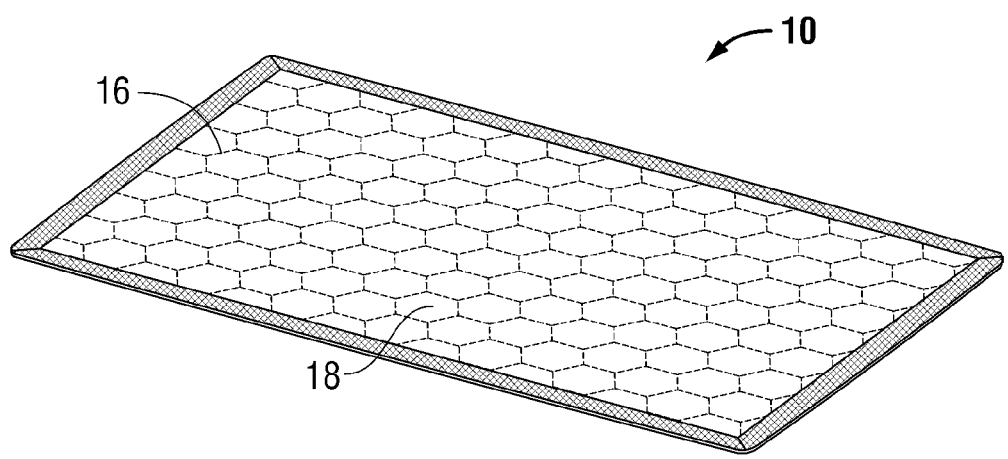

FIGS. 1B through 1E depict exemplary embodiments of mats (10) usable within the scope of the present invention, each depicted embodiment including a differing arrangement of watertight adhesive to define a plurality of enclosed regions having differing shapes and orientations. Specifically, FIG. 1B depicts an embodiment of a mat (10) having watertight adhesive (16) disposed between upper and lower layers in generally parallel horizontal lines, defining a plurality of enclosed regions (18) having the shape of adjacent horizontal rectangles. FIG. 1C depicts an embodiment of a mat (10) having watertight adhesive (16) disposed between upper and lower layers in generally parallel horizontal and vertical lines, defining a grid, thereby providing a plurality of enclosed regions (18) having generally square or rectangular shapes. FIG. 1D depicts an embodiment of a mat (10) having watertight adhesive (16) disposed between upper and lower layers intersecting diagonal lines, defining a plurality of diamond-shaped enclosed regions (18). FIG. 1E depicts an embodiment of a mat (10) having watertight adhesive (16) disposed between upper and lower layers in a repeating hexagonal pattern, defining enclosed regions (18) having a honeycomb orientation. It should be understood that the depicted arrangements of watertight adhesive and enclosed regions shown in FIGS. 1A through 1E are exemplary embodiments, and other shapes and/or arrangements are also usable.

Referring now to FIG. 2, a partial, exploded, cross-sectional view of the mat (10) of FIG. 1A is shown. As described previously, the mat (10) is shown having a liquid permeable upper layer (12) secured above a liquid impermeable lower layer (14) through use of a watertight adhesive (16). In the cross-sectional view of FIG. 2, the liquid impermeable lower layer (14) is shown having ridges or corrugations (26), which are usable to contain and/or channel fluid that permeates thorough the liquid permeable upper layer (12). Numerous segments of the watertight adhesive (16) are visible, defining the lateral boundaries of numerous enclosed regions (18) within the mat (10). Sufficient watertight adhesive (16) can be provided such that the watertight adhesive (16) extends vertically from the liquid impermeable lower layer (14) to the top surface of the liquid permeable upper layer (12) to prevent lateral permeation of spilled liquid through the liquid permeable upper layer (12). In an embodiment of the invention, the watertight adhesive (16) can extend a selected distance above the liquid permeable upper layer (12) to form a ridge for further inhibiting lateral permeation of liquid while enhancing the appearance and/or traction of the mat (10).

A liquid container (22) is shown placed on top of the mat (10) above the plurality of enclosed regions (18), such that liquid (24) spilled from the container (22) passes through the liquid permeable upper layer (12) to collect within one or more of the enclosed regions (18). The liquid (24) is thereby contained and prevented from vertical permeation by the liquid impermeable lower layer (14), while being prevented from lateral permeation by the watertight adhesive (16). When it is desired to dispose of the mat (10) and/or the liquid (24), embodiments of the mat (10) can be transported in a generally horizontal orientation, such as by slightly bending or folding the mat to prevent spillage of any excess liquid until disposal in a suitable location.

Referring now to FIG. 3, a partial, exploded, cross sectional view of an alternate embodiment of a mat (10) usable within the scope of the present invention is shown. The depicted mat (10) includes a liquid permeable upper layer (12) disposed above a liquid impermeable lower layer (14), as described previously, having watertight adhesive (16) securing the upper and lower layers (12, 14) together while defining a plurality of enclosed regions (18). An absorbent middle layer (28) is shown disposed between the upper and lower layers (12, 14), such that liquid spilled on to the mat (10), that penetrates through the liquid permeable upper layer (12), is absorbed by the middle layer (28). Use of an absorbent middle layer (28) can further enhance the ability of the mat (10) to prevent the undesirable spread of liquid by increasing the capacity of the mat to absorb and contain spilled liquid.

Referring now to FIG. 4, a partial, exploded, cross sectional view of another embodiment of a mat (10) usable within the scope of the present invention is shown. The depicted mat (10) includes a liquid permeable upper layer (12) disposed above a generally smooth, liquid impermeable lower layer (14), which lacks the ridges and/or corrugations shown in FIGS. 2 and 3 to reduce expense and facilitate ease of manufacturing the product. Watertight adhesive (16) is shown securing the upper and lower layers (12, 14) together while defining a plurality of enclosed regions (18), as described previously, such that liquid (24) spilled on to the mat (10) permeates through the liquid permeable upper layer (12) to become enclosed within one or more of the enclosed regions (18).

It should be noted that FIGS. 2-4 depict an exaggerated, exploded, cross sectional view of selected embodiments of mats usable within the scope of the present invention to provide clarity of various elements and their respective positioning relative to one another. Any dimensions, spacing, and/or orientation of components with the depicted mats are usable within the scope of the invention, and the exploded views of FIGS. 2-4 are not intended to connote any specific thickness or spacing between components.

Embodiments of the present invention thereby provide methods for containing a spilled liquid that incorporate use of disposable mats that prevent both vertical and lateral transport of the spilled liquid from within an enclosed region. The disclosed mats are more durable than conventional disposable placemats or feeding mats to facilitate cleanup and disposal of spilled liquids, while providing improved effectiveness and usable life.

While the present invention has been described with emphasis on certain embodiments, it should be understood that within the scope of the appended claims, the present invention can be practiced other than as specifically described herein.

What is claimed is:

1. A disposable mat for containing a spilled liquid, the mat comprising:
    a liquid permeable upper layer comprising a top surface;
    a liquid impermeable lower layer disposed beneath the liquid permeable upper layer comprising at least one ridge extending from an upper surface thereof, at least one corrugation formed in the upper surface thereof, or combinations thereof, to channel the spilled liquid; and
    a watertight adhesive disposed between the liquid permeable upper layer and the liquid impermeable lower layer, wherein the watertight adhesive secures the liquid permeable upper layer to the liquid impermeable lower layer, wherein the watertight adhesive encloses at least one bounded region between the liquid permeable upper layer and the liquid impermeable lower layer, wherein the watertight adhesive extends vertically from the liquid impermeable lower layer to the top surface of the liquid permeable upper layer such that the watertight adhesive forms a lateral boundary, wherein spilled liquid provided to the mat permeates through the liquid permeable upper layer into the at least one bounded region, wherein the spilled liquid is inhibited from further vertical permeation by the liquid impermeable lower layer, and wherein the spilled liquid is inhibited from lateral permeation beyond the at least one bounded region by the lateral boundary such that the spilled liquid is confined to the at least one bounded region.

2. The mat of claim 1, further comprising a vessel containing a liquid disposed on the liquid permeable upper layer above the at least one bounded region, wherein the vessel is accessible to a user, and wherein that liquid spilled from the vessel permeates through the liquid permeable upper layer into the at least one bounded region.

3. The mat of claim 2, wherein the mat is adapted for use by a feline, a canine, or a human.

4. The mat of claim 1, wherein the liquid permeable upper layer comprises a porous or fibrous, disposable material, an at least partially absorbent material, or combinations thereof.

5. The mat of claim 1, wherein the liquid impermeable lower layer, the liquid permeable upper layer, or combinations thereof, comprise a disposable material selected from the group consisting of: plastic, rubber, at least one composite, at least one polymer, and combinations thereof.

6. The mat of claim 1, wherein the at least one bounded region comprises a plurality of bounded regions.

7. The mat of claim 1, wherein the at least one bounded region comprises a pattern selected from the group consisting of: a grid, adjacent rectangles, a honeycomb pattern, a diamond pattern, or combinations thereof.

8. The mat of claim 1, further comprising an absorbent layer disposed between the liquid permeable upper layer and the liquid impermeable lower layer.

9. The mat of claim 1, wherein an engagement between the liquid permeable upper layer and the liquid impermeable lower layer defines an edge, and wherein the engagement comprises a crimped edge, a pressed edge, an adhered edge, or combinations thereof between the liquid permeable upper layer and the liquid impermeable lower layer.

10. The mat of claim 1, wherein the liquid impermeable lower layer comprises a thickness, a durability, or combinations thereof adapted to enable the mat and the spilled liquid to be lifted without significant bending or folding of the mat by a weight of the spilled liquid.

11. The mat of claim 1, wherein the liquid impermeable lower layer comprises an adhesive surface, a frictional surface, a non-slip surface, or combinations thereof disposed on at least a portion of an underside thereof.

12. The mat of claim 1, wherein the watertight adhesive comprises a rubber, a resin, a polymer, a copolymer, or combinations thereof.

13. The mat of claim 1, wherein the liquid permeable upper layer and the liquid impermeable lower layer comprise a material having a flexibility adapted to enable storage of the mat on a cylindrical roll.

14. A disposable mat for containing a spilled liquid, the mat comprising:
    a liquid permeable upper layer comprising a top surface;
    a liquid impermeable lower layer disposed beneath the liquid permeable upper layer; and
    a watertight adhesive disposed between the liquid permeable upper layer and the liquid impermeable lower layer, wherein the watertight adhesive secures the liquid permeable upper layer to the liquid impermeable lower layer, wherein the watertight adhesive encloses at least one bounded region between the liquid permeable upper layer and the liquid impermeable lower layer, wherein the watertight adhesive extends vertically from the liquid impermeable lower layer to the top surface of the liquid permeable upper layer as well as a selected distance above the top surface, such that the watertight adhesive forms a lateral boundary and a ridge to further prevent lateral escape of liquid from the enclosed region, wherein spilled liquid provided to the mat permeates through the liquid permeable upper layer into the at least one bounded region, wherein the spilled liquid is inhibited from further vertical permeation by the liquid impermeable lower layer, and wherein the spilled liquid is inhibited from lateral permeation beyond the at least one bounded region by the lateral boundary such that the spilled liquid is confined to the at least one bounded region.

15. The mat of claim 14, further comprising a vessel containing a liquid disposed on the liquid permeable upper layer above the at least one bounded region, wherein the vessel is accessible to a user, and wherein that liquid spilled from the vessel permeates through the liquid permeable upper layer into the at least one bounded region.

16. The mat of claim 14, wherein the liquid permeable upper layer comprises a porous or fibrous, disposable material, an at least partially absorbent material, or combinations thereof.

17. The mat of claim 14, wherein the liquid impermeable lower layer comprises an adhesive surface, a frictional surface, a non-slip surface, or combinations thereof disposed on at least a portion of an underside thereof.

18. The mat of claim 14, wherein the watertight adhesive comprises a rubber, a resin, a polymer, a copolymer, or combinations thereof.

19. The mat of claim 14, further comprising an absorbent layer disposed between the liquid permeable upper layer and the liquid impermeable lower layer.

20. The mat of claim 14, wherein the liquid impermeable lower layer, the liquid permeable upper layer, or combinations thereof, comprise a disposable material selected from the group consisting of: plastic, rubber, at least one composite, at least one polymer, and combinations thereof.

* * * * *